(12) United States Patent
Hopper et al.

(10) Patent No.: US 8,769,539 B2
(45) Date of Patent: Jul. 1, 2014

(54) SCHEDULING SCHEME FOR LOAD/STORE OPERATIONS

(75) Inventors: Daniel Hopper, Austin, TX (US);
Suzanne Plummer, Austin, TX (US);
Christopher D. Bryant, Austin, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 784 days.

(21) Appl. No.: 12/947,715

(22) Filed: Nov. 16, 2010

(65) Prior Publication Data

US 2012/0124586 A1    May 17, 2012

(51) Int. Cl.
*G06F 9/30* (2006.01)
*G06F 9/40* (2006.01)
*G06F 9/38* (2006.01)
*G06F 9/48* (2006.01)

(52) U.S. Cl.
CPC ............ *G06F 9/3836* (2013.01); *G06F 9/4881* (2013.01); *G06F 9/3802* (2013.01)
USPC ........... 718/102; 712/205; 712/214; 712/220; 712/233

(58) Field of Classification Search
None
See application file for complete search history.

(56) References Cited

U.S. PATENT DOCUMENTS

2012/0066483 A1* 3/2012 Boury et al. .................. 712/233

* cited by examiner

*Primary Examiner* — Qing Wu
(74) *Attorney, Agent, or Firm* — Williams Morgan, P.C.

(57) ABSTRACT

A method and apparatus are provided to control the order of execution of load and store operations. Also provided is a computer readable storage device encoded with data for adapting a manufacturing facility to create the apparatus. One embodiment of the method includes determining whether a first group, comprising at least one or more instructions, is to be selected from a scheduling queue of a processor for execution using either a first execution mode or a second execution mode. The method also includes, responsive to determining that the first group is to be selected for execution using the second execution mode, preventing selection of the first group until a second group, comprising at least one or more instructions, that entered the scheduling queue prior to the first group is selected for execution.

27 Claims, 7 Drawing Sheets

SCHEDULING SCHEME FOR LOAD/STORE OPERATIONS

BACKGROUND

1. Field of the Invention

Embodiments of this invention relate generally to processors, and, more particularly, to a method, system and apparatus for controlling the order of execution of operations to maximize processor performance.

2. Description of Related Art

A typical computer program is a list of instructions, which when compiled or assembled, generates a sequence of machine instructions or operations that a processor executes. The operations have a program order defined by the logic of the computer program and are generally intended for sequential execution in the program order. Scalar processors execute the operations in the program order, which limits a scalar processor to completing one operation before completing the next operation. Superscalar processors contain a variety of execution units that operate in parallel to execute and complete multiple operations in parallel. Superscalar processors can therefore be faster than scalar processors operating at the same clock speed because superscalar processors can complete multiple operations per clock cycle while scalar processors ideally complete one operation per cock cycle.

A superscalar processor typically schedules execution of operations so that operations can be executed in parallel and complete out of the normal program order. Difficulties in out-of-order execution arise because one operation may depend on another in that the logic of a computer program requires that the first operation in the program be executed before the second operation. For example, a superscalar processor that is capable of issuing and executing machine instructions out of order may permit loads to be executed ahead of stores and stores to be executed ahead of loads. This feature permits a large performance advantage provided that the load address and the store address do not both have the same physical address. In typical programs, the frequency that a load precedes the store (or a store precedes the load) and that their physical address matches is low. However, because the discovery of this type of violation is typically late in the instruction execution pipeline, the recovery penalty can be quite severe. The recovery process typically involves, flushing the execution pipeline by invalidating the load (or store) instruction that caused the violation and all newer instructions in program order beyond the load (or store) instruction, and subsequently reissuing the offending instruction.

SUMMARY OF EMBODIMENTS OF THE INVENTION

In one embodiment of the present invention, a method is provided. The method includes determining whether a first group, comprising at least one or more instructions, is to be selected from a scheduling queue of a processor for execution using either a first execution mode or a second execution mode. The method also includes, responsive to determining that the first group is to be selected for execution using the second execution mode, preventing selection of the first group until a second group, comprising at least one or more instructions, that entered the scheduling queue prior to the first group is selected for execution.

In another embodiment of the invention, an apparatus is provided. The apparatus includes a scheduling queue and a processor. The processor is configured to determine whether a first group, comprising at least one or more instructions, is to be selected from a scheduling queue of a processor for execution using either a first execution mode or a second execution mode. The processor is also configured to, responsive to determining that the first group is to be selected for execution using the second execution mode, prevent selection of the first group until a second group, comprising at least one or more instructions, that entered the scheduling queue prior to the first group is selected for execution.

In yet another embodiment of the invention, a computer readable storage device encoded with data that, when implemented in a manufacturing facility, adapts the manufacturing facility to create an apparatus is provided. The apparatus created comprises a scheduling queue and a processor. The processor is configured to determine whether a first group, comprising at least one or more instructions, is to be selected from a scheduling queue of a processor for execution using either a first execution mode or a second execution mode. The processor is also configured to, responsive to determining that the first group is to be selected for execution using the second execution mode, prevent selection of the first group until a second group, comprising at least one or more instructions, that entered the scheduling queue prior to the first group is selected for execution.

BRIEF DESCRIPTION OF THE DRAWINGS

The invention may be understood by reference to the following description taken in conjunction with the accompanying drawings, in which the leftmost significant digit(s) in the reference numerals denote(s) the first figure in which the respective reference numerals appear, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which may vary from one implementation to another. Moreover, it will be appreciated that such a development effort might be complex and time-consuming, but may nevertheless be a routine undertaking for those of ordinary skill in the art having the benefit of this disclosure.

The present invention will now be described with reference to the attached figures. Various structures, connections, systems and devices are schematically depicted in the drawings for purposes of explanation only and so as to not obscure the disclosed subject matter with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Embodiments of the present invention generally provide a scheduling scheme to be performed on operations in a processor to prevent performance degradation caused by out-of-order load/store operations. The scheduling scheme can identify problematic store operations, which occur when a store operation passes a load operation to the same target address due to out-of-order execution. Once a problematic store operation is identified, the scheduling scheme may force in-order execution for the problematic store operation. The scheduling scheme may revert back to out-of-order execution once the problematic store operation has executed.

Figure 1:
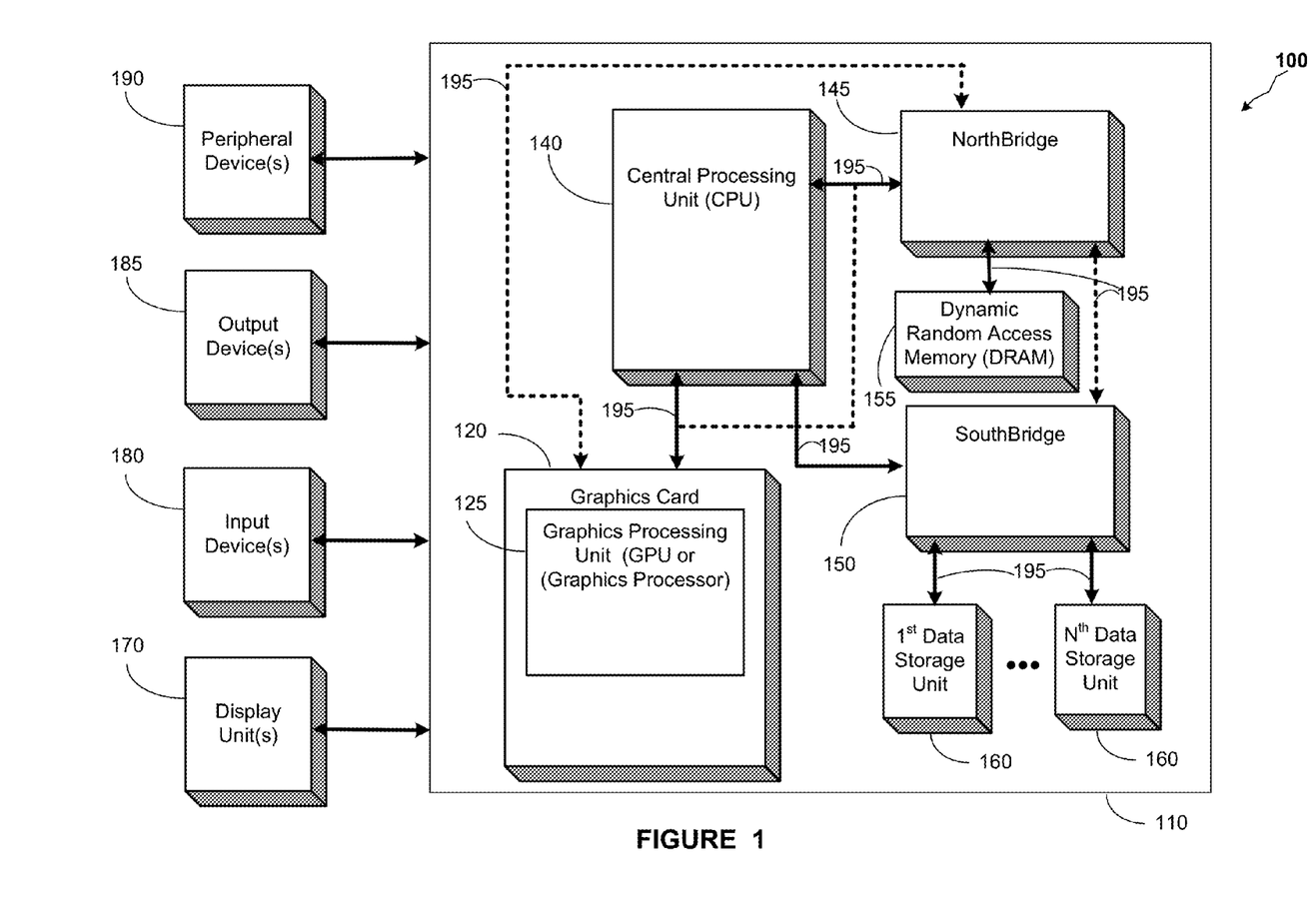
FIG. 1 schematically illustrates a simplified block diagram of a computer system including a graphics card that employs a storage scheme according to one embodiment.

Turning now to FIG. 1, a block diagram of an exemplary computer system 100, in accordance with an embodiment of the present invention, is illustrated. In various embodiments, the computer system 100 may be a personal computer, a laptop computer, a handheld computer, a netbook computer, a mobile device, a telephone, a personal data assistant (PDA), a server, a mainframe, a work terminal, or the like. The computer system includes a main structure 110 which may be a computer motherboard, circuit board or printed circuit board, a desktop computer enclosure and/or tower, a laptop computer base, a server enclosure, part of a mobile device, personal data assistant (PDA), or the like. In one embodiment, the main structure 110 includes a graphics card 120. In one embodiment, the graphics card 120 may be an ATI Radeon™ graphics card from Advanced Micro Devices, Inc. ("AMD") or any other graphics card using memory, in alternate embodiments. The graphics card 120 may, in different embodiments, be connected on a Peripheral Component Interconnect (PCI) Bus (not shown), PCI-Express Bus (not shown) an Accelerated Graphics Port (AGP) Bus (also not shown), or any other connection known in the art. It should be noted that embodiments of the present invention are not limited by the connectivity of the graphics card 120 to the main computer structure 110. In one embodiment, computer runs an operating system such as Linux, Unix, Windows, Mac OS, or the like.

In one embodiment, the graphics card 120 may contain a graphics processing unit (GPU) 125 used in processing graphics data. In various embodiments the graphics card 120 may be referred to as a circuit board or a printed circuit board or a daughter card or the like.

In one embodiment, the computer system 100 includes a central processing unit (CPU) 140, which is connected to a northbridge 145. The CPU 140 and northbridge 145 may be housed on the motherboard (not shown) or some other structure of the computer system 100. It is contemplated that in certain embodiments, the graphics card 120 may be coupled to the CPU 140 via the northbridge 145 or some other connection as is known in the art. For example, CPU 140, northbridge 145, GPU 125 may be included in a single package or as part of a single die or "chips". Alternative embodiments, which alter the arrangement of various components illustrated as forming part of main structure 110, are also contemplated. In certain embodiments, the northbridge 145 may be coupled to a system RAM (or DRAM) 155; in other embodiments, the system RAM 155 may be coupled directly to the CPU 140. The system RAM 155 may be of any RAM type known in the art; the type of RAM 155 does not limit the embodiments of the present invention. In one embodiment, the northbridge 145 may be connected to a southbridge 150. In other embodiments, the northbridge 145 and southbridge 150 may be on the same chip in the computer system 100, or the northbridge 145 and southbridge 150 may be on different chips. In various embodiments, the southbridge 150 may be connected to one or more data storage units 160. The data storage units 160 may be hard drives, solid state drives, magnetic tape, or any other writable media used for storing data. In various embodiments, the central processing unit 140, northbridge 145, southbridge 150, graphics processing unit 125, and/or DRAM 155 may be a computer chip or a silicon-based computer chip, or may be part of a computer chip or a silicon-based computer chip. In one or more embodiments, the various components of the computer system 100 may be operatively, electrically and/or physically connected or linked with a bus 195 or more than one bus 195.

In different embodiments, the computer system 100 may be connected to one or more display units 170, input devices 180, output devices 185 and/or other peripheral devices 190. It is contemplated that in various embodiments, these elements may be internal or external to the computer system 100, and may be wired or wirelessly connected, without affecting the scope of the embodiments of the present invention. The display units 170 may be internal or external monitors, television screens, handheld device displays, and the like. The input devices 180 may be any one of a keyboard, mouse, track-ball, stylus, mouse pad, mouse button, joystick, scanner or the like. The output devices 185 may be any one of a monitor, printer, plotter, copier or other output device. The peripheral devices 190 may be any other device which can be coupled to a computer: a CD/DVD drive capable of reading and/or writing to physical digital media, a USB device, Zip Drive, external floppy drive, external hard drive, phone and/or broadband modem, router/gateway, access point and/or the like. To the extent certain exemplary embodiments of the computer system 100 are not described herein, such exemplary embodiments may or may not be included in various embodiments without limiting the spirit and scope of the embodiments of the present invention as would be understood by one of skill in the art.

Figure 2:
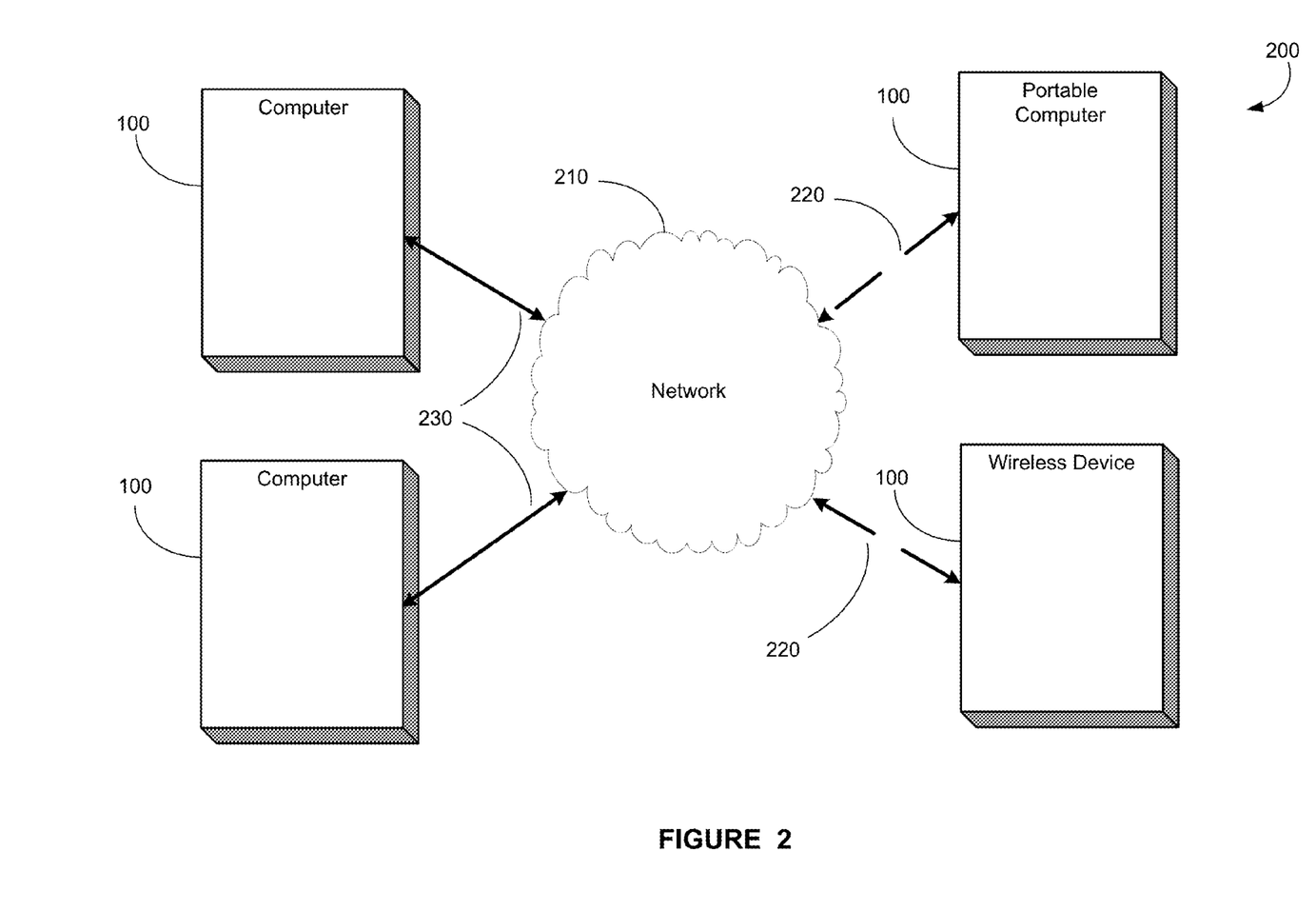
FIG. 2 shows a simplified block diagram of a multiple computer system connected via a network according to one embodiment.

Turning now to FIG. 2, a block diagram of an exemplary computer network 200, in accordance with an embodiment of the present invention, is illustrated. In one embodiment, any number of computer systems 100 may be communicatively coupled and/or connected to each other through a network infrastructure 210. In various embodiments, such connections may be wired 230 or wireless 220 without limiting the scope of the embodiments described herein. The network 200 may be a local area network (LAN), wide area network (WAN), personal network, company intranet or company network, the Internet, or the like. In one embodiment, the computer systems 100 connected to the network 200 via network infrastructure 210 may be a personal computer, a laptop computer, a netbook computer, a handheld computer, a mobile device, a telephone, a personal data assistant (PDA), a server, a mainframe, a work terminal, or the like. The number of computers depicted in FIG. 2 is exemplary in nature; in practice any number of computer systems 100 maybe coupled/connected using the network 200. The computer systems 100 may include one or more embodiments of the invention as described with respect to FIGS. 3-5C.

Figure 3:
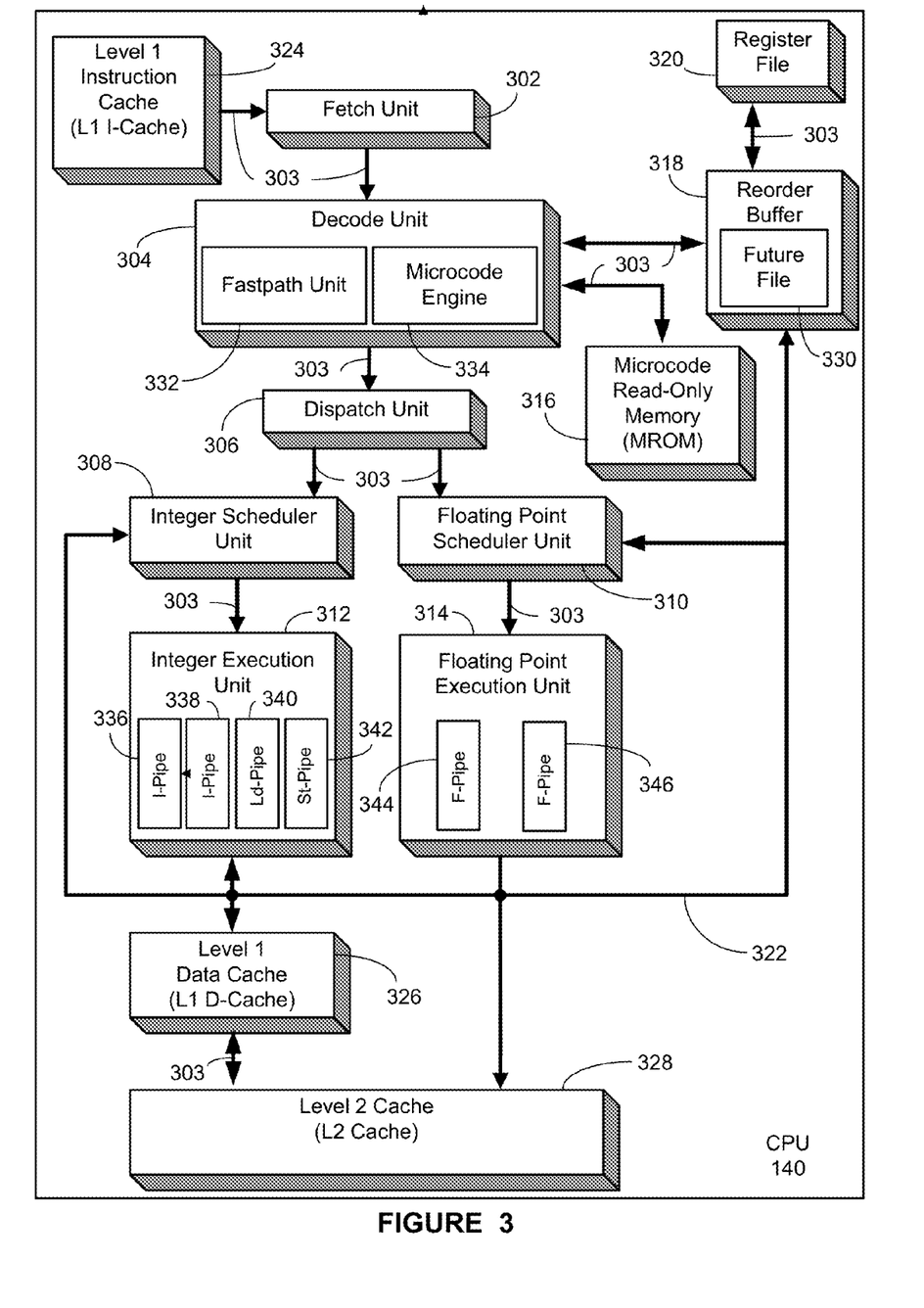
FIG. 3 illustrates an exemplary detailed representation of one embodiment of the central processing unit provided in FIGS. 1-3 according to one embodiment.

Turning now to FIG. 3, a diagram of an exemplary implementation of the CPU 140, in accordance with an embodiment of the present invention, is illustrated. The CPU 140 includes a fetch unit 302, a decode unit 304, a dispatch unit 306, an integer scheduler unit 308 a floating-point scheduler unit 310, an integer execution unit 312, a floating-point execution unit 314, a microcode read-only memory (MROM) 316, a reorder buffer 330, and a register file 320. In one or more embodiments, the various components of the CPU 140 may be operatively, electrically and/or physically connected or linked with a bus 303 or more than one bus 303. The CPU 140 may also include a result bus 322, which couples the integer execution unit 312 and the floating-point execution unit 314 with the reorder buffer 318, the integer scheduler unit 308, and the floating-point execution unit 310. As will be described later, results outputted on the result bus 322 by the execution units 312, 314 may be used as operand values for subsequently issued instructions and/or values stored in the reorder buffer 318. The CPU 140 may also include a Level 1 Instruction Cache (LI I-Cache) 324 for storing instructions, and a Level 1 Data Cache (L1 D-Cache 326) and a Level 2 Cache (L2 Cache) 328 for storing data. As shown, in one embodiment, the L1 D-Cache 326 may be coupled to the integer execution unit 312 via result bus 322, thereby enabling the integer execution unit 312 to request data from the L1 D-Cache 326. In some cases, the integer execution unit 312 may request data not contained in the L1 D-Cache 326. Where requested data is not located in the L1 D-Cache 326, the requested data may be retrieved from a higher-level cache (such as the L2 cache 328) or memory 155 (shown in FIG. 1). In another embodiment, the L1 D-cache 326 may also be coupled to the floating-point execution unit 314. In this case, the integer execution unit 312 and the floating-point execution unit 314 may share a unified L1 D-Cache 326. In another embodiment, the floating-point execution unit 314 may be coupled to its own respective L1 D-Cache. As shown, in one embodiment, the integer execution unit 312 and the floating-point execution unit 314 may be coupled to and share an L2 cache 328. In another embodiment, the integer execution unit 312 and the floating-point execution unit 324 may be each coupled to its own respective L2 cache. In one embodiment, the L2 cache may provide data to the L1 I-Cache 324 and L1 D-Cache 326. In another embodiment, the L2 cache 328 may also provide instruction data to the L1 I-Cache 324. In different embodiments, the L1 I-Cache 324, LI D-Cache 326, and the L2 Cache 328 may be may be implemented in a fully-associated, set-associative, or direct mapped configuration. In one embodiment, the L2 Cache 328 may be larger than the L1 I-Cache 324 or the L1 D-Cache 326. In alternate embodiments, the L1 I-Cache, L1 D-Cache and/or the L2 cache may be separate from or external to the CPU 140 (e.g. located on the motherboard). It should be noted that embodiments of the present invention are not limited by the sizes and configuration of the L1 I-Cache 324, L1 D-Cache 326, and the L2 cache 328.

Referring still to FIG. 3, the CPU 140 may support out-of-order instruction execution. Accordingly, the reorder buffer 318 may be used to maintain the original program sequence for register read and write operations, to implement register renaming, and to allow for speculative instruction execution and branch mis-prediction recovery. The reorder buffer 318 may be implemented in a first-in-first-out (FIFO) configuration in which operations move to the bottom of the buffer 318 as they are validated, making room for new entries at the top of the buffer 318. The reorder buffer 318 may retire an operation once an operation completes execution and any data or control speculation performed on any operations, up to and including that operation in program order, is verified. In the event that any data or control speculation performed on an operation is found to be incorrect (e.g., a branch prediction is found to be incorrect), the results of speculatively-executed instructions along the mis-predicted path may be invalidated within the reorder buffer 318. It is noted that a particular instruction is speculatively executed if it is executed prior to instructions that precede the particular instruction in program order.

In one embodiment, the reorder buffer 318 may also include a future file 330. The future file 330 may include a plurality of storage locations. Each storage location may be assigned to an architectural register of the CPU 140. For example, in the x86 architecture, there are eight 32-bit architectural registers (e.g., Extended Accumulator Register (EAX), Extended Base Register (EBX), Extended Count Register (ECX), Extended Data Register (EDX), Extended Base Pointer Register (EBP), Extended Source Index Register (ESI), Extended Destination Index Register (EDI) and Extended Stack Pointer Register (ESP)). Each storage location may be used to store speculative register states (i.e., the most recent value produced for a given architectural register by any instruction). Non-speculative register states may be stored in the register file 320. When register results stored within the future file 330 are no longer speculative, the results may be copied from the future file 330 to the register file 320. The storing of non-speculative instruction results into the register file 320 and freeing the corresponding storage locations within reorder buffer 318 is referred to as retiring the instructions. In the event of a branch mis-prediction or discovery of an incorrect speculatively-executed instruction, the contents of the register file 320 may be copied to the future file 330 to replace any erroneous values created by the execution of these instructions.

Figure 4:
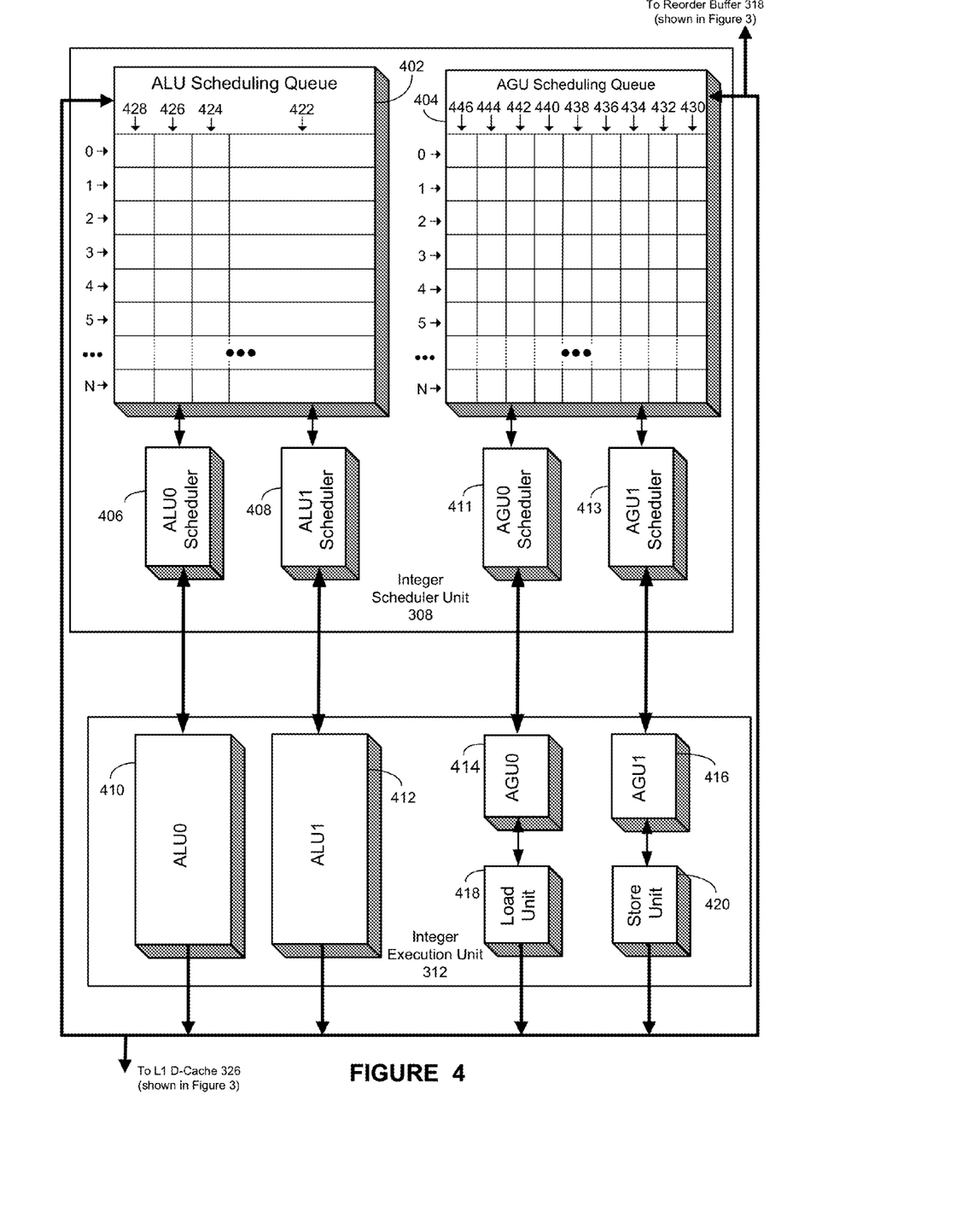
FIG. 4 illustrates an exemplary detailed representation of one embodiment of the integer scheduler unit and the integer execution unit provided in FIG. 3 according to one embodiment.

Referring still to FIG. 4, the fetch unit 302 may be coupled to the L1 I-cache 324 (or a higher memory subsystem, such as the L2 cache 328 or external memory 155 (shown in FIG. 1)). The fetch unit 302 may fetch instructions from the L1 I-Cache for the CPU 140 to process. The fetch unit 302 may contain a program counter, which holds the address in the L1 I-Cache 324 (or higher memory subsystem) of the next instruction to be executed by the CPU 140. In one embodiment, the instructions fetched from the L1 I-cache 324 may be complex instruction set computing (CISC) instructions selected from a complex instruction set, such as the x86 instruction set implemented by processors conforming to the x86 processor architecture. Once the instruction has been fetched, the instruction may be forwarded to the decode unit 304.

The decode unit 304 may decode the instruction and determine the opcode of the instruction, the source and destination operands for the instruction, and a displacement value (if the instruction is a load or store operation) specified by the encoding of the instruction. The source and destination operands may be values in registers or in memory locations. A source operand may also be a constant value specified by immediate data specified in the instruction encoding. Values for source operands located in registers may be requested by the decode unit 304 from the reorder buffer 318. The reorder buffer 318 may respond to the request by providing either the value of the register operand or an operand tag corresponding to the register operand for each source operand. The reorder buffer 318 may access the future file 330 to obtain values for register operands. If a register operand value is available within the future file 330, the future file 330 may return the register operand value to the reorder buffer 318. On the other hand, if the register operand value is not available within the future file 330, the future file 330 may return an operand tag corresponding to the register operand value. The reorder buffer 318 may then provide either the operand value (if the value is ready) or the corresponding operand tag (if the value is not ready) for each source register operand to the decode unit 304. The reorder buffer 318 may also provide the decode unit 304 with a result tag associated with the destination operand of the instruction if the destination operand is a value to be stored in a register. In this case, the reorder buffer 318 may also store the result tag within a storage location reserved for the destination register within the future file 330. As will be discussed below, as instructions (or micro-operations, as will be discussed below) are completed by the execution units 312, 314, each of the execution units 312, 314 may broadcast the result of the instruction and the result tag associated with the result on the result bus 303. When each of the execution units 312, 314 produces the result and drives the result and the associated result tag on the result bus 322, the reorder buffer 318 may determine if the result tag matches any tags stored within. If a match occurs, the reorder buffer 318 may store the result within the storage location allocated to the appropriate register within the future file 330.

In one embodiment, after the decode unit 304 decodes the instruction, the decode unit 304 may forward the instruction to one of the execution units 312, 314 for execution. In another embodiment, the decode unit 304 may convert an instruction into at least one or more smaller micro-operations (hereinafter, "micro-ops"), which are simple low-level instructions (as opposed to the more complex instructions stored in L1 I-Cache 324). The decode unit 304 may convert an instruction into micro-ops using either a fastpath unit 332 or a microcode engine 334. In one embodiment, the decode unit 304 may use the opcode to determine whether or not to use either the fastpath unit 332 or the microcode engine 334. That is, some opcodes may direct the decode unit 304 to use the fastpath unit 332 to convert the instruction into micro-ops, while other opcodes may direct the decode unit 304 to use the microcode engine 334 to convert the instructions into micro-ops. Most common x86 instructions, which are typically translated into a sequence of one to four micro-ops, are converted into micro-ops by the fastpath unit 332. Consider, for example, a common x86 instruction such as an ADD instruction, which adds the contents of a source register into a destination register. In this case, a single micro-op would be generated that adds the contents of the source register into the destination register. Contrast this with an ADD instruction that adds the contents of a source register to a location in memory. In this case, three micro-ops would be generated. The first micro-op would read the contents from the memory location and place the contents into a temporary register in the CPU 140. The second micro-op would add the contents of the source register to the contents of the temporary register. The last micro-op would write the result of the addition back to the memory location.

Less common x86 instructions and complex x86 instructions that translate into a sequence longer than four micro-ops may be converted into micro-ops by the microcode engine 334. The micro-ops corresponding to these types of instructions may be stored in the MROM 316 and may be referred to as a microcode sequence. In the event that the decode unit 304 determines that an instruction is to be converted using the microcode engine 334, the microcode engine 334 may determine an address within the MROM 316 at which the corresponding micro-ops are stored and fetch the micro-ops. The microcode engine 334 may map or translate some or all of the complex instruction encoding to an MROM address that contains the corresponding micro-ops. The mapping may be performed by a lookup table, content-addressable memory, combinatorial, logic, or any other mechanism for translating the complex instruction encoding to an MROM address. It should be noted that embodiments of the present invention are not limited by the type of mapping used to determine the MROM address.

In one embodiment, the decode unit 304 may set a value for a mode flag for each of the micro-ops generated, which indicates an execution mode for each of the micro-ops. For example, if a mode flag is set to a value of zero, the micro-op associated with the mode flag may be executed using out-of-order execution (i.e., the micro-op may not be executed in program order). Conversely, if a mode flag is set to a value of one, the associated micro-op may be executed using in-order execution (i.e., the micro-op is executed in program order). It is noted that the value of the mode flag used to indicate an execution mode is arbitrary and used simply for demonstrative purposes; that is, any value can be used to represent an execution mode.

In one embodiment, the decode unit 304 may set the mode flag to in-order execution mode for micro-ops resulting from instructions that are known to have load/store dependencies (i.e., micro-ops that load or store data to and from the same address). It is noted that the load or store address for a given micro-op is typically not known until later in the execution pipeline. As will be discussed later, an address generation unit located in the integer execution unit 312 calculates an address for a load or store micro-op. As a result, the decode unit 304 may set the mode flag to in-order execution mode for instructions that are known to have load/store dependencies, rather than for instructions that actually have load/store dependences. Such instructions include, but are not limited to, string-manipulation instructions. In one embodiment, if the decode unit 304 encounters an opcode for an instruction that is known to have a load/store dependency, the decode unit 304 may set the mode flag for each micro-op resulting from the instruction to in-order execution mode. On the other hand, if the decode unit 304 encounters an opcode for an instruction that is not known to have a load/store dependency, the decode unit 304 may set the mode flag for each micro-op resulting from the instruction to out-of-order execution mode.

Referring still to FIG. 3, once the fastpath unit 332 or the microcode engine 334 converts an instruction into micro-ops, the micro-ops may be subsequently forwarded to the dispatch unit 306. The decode unit 304 may also forward any data associated with the micro-ops (e.g., operand values/tags, result tags, mode flags, immediate values and displacement values) to the dispatch unit 306. The dispatch unit 306 may determine if the micro-ops (and the data associated with the micro-ops) are forwarded to either the integer scheduler unit 308 or the floating-point scheduler unit 310. For example, if an opcode for an instruction indicates that the instruction is an integer-based operation, the dispatch unit 306 may forward the associated micro-ops (and data associated with the micro-ops) of the instruction to the integer scheduler unit 308. Conversely, if the opcode indicates that the instruction is a floating-point operation, the dispatch unit 306 may forward the associated micro-ops of the instruction (and the data associated with the micro-ops) to the floating-point scheduler unit 310.

In one embodiment, the dispatch unit 306 may set the value for the mode flag for each of the micro-ops generated instead of the decode unit 304. The dispatch unit 306 may set the mode flag to either out-of-order execution mode or in-order execution mode based on whether the micro-ops were generated using the fastpath unit 332 or the microcode engine 334. For example, in some embodiments, the micro-ops stored in the MROM 316 may only be for those instructions that are known to have load/store dependencies. Thus, whenever the dispatch unit 306 encounters micro-ops that were generated using the microcode engine 334, the dispatch unit 306 may set the mode flag to in-order execution. On the other hand, whenever the dispatch unit 206 encounters micro-ops that were generated using the fastpath unit 332, the dispatch unit 306 may set the mode flag to out-of-order execution mode. After the dispatch unit 306 sets the mode flag for each of these micro-ops, the mode flag is forwarded to the appropriate scheduler unit (i.e., either the integer scheduler unit 308 or the floating point scheduler unit 310).

Once a micro-op is ready for execution, the micro-op is forwarded from the appropriate scheduler unit 308, 310 to the appropriate execution unit 312, 314. Micro-ops from the integer scheduler unit 308 are forwarded to the integer execution unit 312. In one embodiment, integer execution unit 312 includes two integer execution pipelines 336, 338, a load execution pipeline 340 and a store execution pipeline 342, although alternate embodiments may add to or subtract from the set of integer execution pipelines and load and store execution pipelines. Arithmetic and logical micro-ops may be forwarded to either one of the two integer execution pipelines 336, 338, where the micro-ops are executed and the results of the arithmetic or logical operation are broadcast to the reorder buffer 318, future file 330, and the scheduler units 308, 310 via the result bus 322. Load and store micro-ops may be forwarded, respectively, to the load execution pipeline 340 and store execution pipeline 342, where the address for the load or store operation is calculated, and the L1 D-Cache 326 (or L2 cache 328 or memory 155 (shown in FIG. 1), is accessed to either write the data for a store operation or read the data for a load operation.

Micro-ops from the floating-point scheduler unit 310 are forwarded to the floating-point execution unit 314, which comprises two floating-point execution pipelines 344, 346, although alternate embodiments may add to or subtract from the set of floating-point execution pipelines. The first execution pipeline 342 may be used for floating point division, multiplication and single-instruction multiple data (SIMD) permute instructions, while the second execution pipeline 344 may be used for other SIMD scalar instructions. Once the operations from either of the floating-point execution pipelines 344, 346 have completed, the results from the micro-ops may be written back to the reorder buffer 330, the floating-point scheduling unit 310, and the L2 cache 328 (or memory 155 (shown in FIG. 1)).

Turning now to FIG. 4, a diagram of an exemplary implementation of the integer scheduler unit 308 and the integer execution unit 312, in accordance with an embodiment of the present invention, is illustrated. In one embodiment, the integer scheduler unit 308 may include an arithmetic logic unit (ALU) scheduling queue 402 and an address generation unit (AGU) scheduling queue 404. The ALU scheduling queue 402 may be coupled to a first ALU scheduler (ALU0 scheduler 406) and a second ALU scheduler (ALU1 scheduler 408). Each ALU scheduler 406, 408 may be coupled to a respective ALU unit (ALU0 410, ALU1 412) located in the integer execution unit 312. The AGU scheduling queue 404 may be coupled to a first AGU scheduler (AGU0 scheduler 411) and second AGU scheduler (AGU1 scheduler 413). Each AGU scheduler 411, 413 may be coupled to a respective AGU (AGU0 414, AGU1 416) located in the integer execution unit 312. AGU0 414 may be coupled to a load unit 418 and AGU1 416 may be coupled to a store unit 420. Both the load unit 418 and the store unit 420 may be located in the integer execution unit. 312

The ALU scheduling queue 402 and the AGU scheduling queue 404 may each be organized as an ordered array of 1 to N storage entries. Each scheduling queue 402, 404 may be implemented in a FIFO configuration in which operations move to the bottom of the queue, making room for new entries at the top of the queue. New micro-ops are loaded in at the top and shift toward the bottom as new micro-ops are loaded into its respective queue 402, 404. Therefore, newer or "younger" micro-ops are stored toward the top of the queue 402, 404, while "older" micro-ops are stored toward the bottom of the queue 402, 404. Micro-ops may be executed out-of-order. Therefore, it is possible that younger micro-ops may be executed before older ops, and older micro-ops may be executed before younger micro-ops. Once a micro-op is executed, the micro-op is removed from its respective scheduling queue 402 404, and the younger micro-ops in the queue 402, 404 are shifted downward.

The ALU scheduling queue 402 may store the micro-ops that perform arithmetic and logic operations, and the AGU scheduling queue 404 may store the micro-ops that perform load and store operations. The micro-ops and the data associated with the micro-ops (e.g., operand values/tags, result tags, immediate values, displacement values, mode flags) are dispatched into their respective scheduling queue 402, 404 by the dispatch unit 306 (illustrated in FIG. 3). The dispatch unit 306 may forward micro-ops to either the ALU scheduling queue 402 or the AGU scheduling unit 404, depending on the type of micro-op. For example, if the micro-op is an arithmetic or logic operation, the micro-op may be forwarded to the ALU scheduling queue 402. On the other hand, if the micro-op is a load or store operation, the micro-op may be forwarded to the AGU scheduling queue 404. As shown, in one embodiment, a single AGU scheduling queue 404 may be used to store both load and store micro-ops. In another embodiment, a first AGU scheduling queue (not shown) may be used for load micro-ops, and a second AGU scheduling queue (not shown) may be used for store micro-ops.

Each storage entry in the ALU scheduling queue 402 and AGU scheduling queue 404 may include a plurality of associated fields to store the associated data for each micro-op. Beginning with the ALU scheduling queue 402, each ALU scheduling queue 402 may have a micro-op field 422, a first source operand field 424, a second source operand field 426, and a result field 428. The micro-op field 422 may contain the micro-op awaiting execution. The result field 428 may store the result tag corresponding to the destination operand. The first and second source operand fields 424, 426 each contain either an operand value or an operand tag for the micro-op. An operand value may either be an immediate value or a value stored in a register. If the value is stored in a register, the future file 330 may provide the operand value if the value is ready. In the event that the operand value is not ready, the future file 330 may provide an operand tag. In order to replace an operand tag with an operand value, the ALU scheduling queue 402 may continuously monitor the result bus 322 for result tags. If a result tag that is driven upon the result bus 322 matches an operand tag stored within the ALU scheduler queue 402, the ALU scheduler queue 402 may replace the operand tag with the corresponding value driven upon the result bus 322.

Turning now to the AGU scheduling queue 404, each entry in the AGU scheduling queue 404 may include a micro-op field 430, a displacement field 432, a first source operand field 434, a second source operand field 436, a third operand field 438, a result field 440, a load/store field 442, an execution mode field 444, and a mask field 446. The micro-op field 430 contains the load or store micro-op awaiting execution. The displacement field 432 contains the displacement value used to generate a load or store address. The result field 440 stores the result tag corresponding to a destination operand (e.g., for a load operation that loads data from a memory address into a destination register). As previously mentioned, the displacement value may be decoded from the encoded instruction by the decode unit 304. The first, second, and third source operand fields 434, 436, 438 each contain either an operand value or an operand tag for the micro-op. The first source operand field 434 may represent a base address used to generate a load or store address. The second source operand field 436 may represent an index used to generate a load or store address. The third source operand field 438 may represent data to be stored at a memory address for a store operation. The operands for the first and second source operand fields 434, 436 may be stored in registers, while the operand for the third source operand field 438 may be immediate data or data stored in a register. As previously mentioned, for operand values stored in registers, the future file 330 may provide an operand value (if the value is ready), or may provide an operand tag (if the value is not ready). In order to update the operand tag with an operand value, the AGU scheduling queue 404 may continuously monitor the result bus 322 for result tags. If a result tag that is driven upon the result bus 322 matches an operand tag stored within the AGU scheduling queue 404, the AGU scheduler queue 404 may replace the operand tag with the corresponding value driven upon the result bus 322. The load/store field 442 contains a value indicating whether or not the micro-op is a load operation or a store operation. The value may be set by the decode unit 304 and forwarded to the dispatch unit 306, where it is dispatched to the AGU scheduling queue 404 along with the associated micro-op. The execution mode field 444 may contain the mode flag associated with the micro-op. As previously mentioned, the mode flag may be set by the dispatch unit 306 and indicates whether or not a micro-op is to be executed in-order or out-of-order with respect to the other micro-ops in the AGU scheduling queue 404. The mask field 446 may contain a flag that indicates whether or not a micro-op in the AGU scheduling queue 404 is available for out-of-order execution. As will be described below, if the mask flag is set for a particular micro-op, that micro-op will not be available for execution when the AGU scheduler 410, 412 is in out-of-order execution mode. The micro-op will be prevented from being executed until the mask flag is cleared. Accordingly, if the mask flag is cleared for a particular micro-op, that micro-op is available for execution when at least one of the AGU schedulers 411, 413 is in out-of-order execution mode. Operations regarding the mask field will be further described with reference to FIG. 5C.

Referring still to FIG. 4, the manner in which a micro-op is selected from its respective scheduling queue and subsequently executed will now be described. Turning again to the ALU scheduling queue 404, micro-ops may be selected for execution by one of two ALU schedulers 406, 408. Each ALU scheduler 406, 408 may select a micro-op concurrently. Therefore, it is possible for two arithmetic or logic micro-ops to be selected at once. Furthermore, because each ALU scheduler 406, 408 is coupled to a respective ALU, it is also possible for two arithmetic or logic micro-ops to be executed at once.

Each ALU scheduler 406, 408 monitors the ALU scheduling queue 402 for ready micro-ops. A micro-op may be considered ready if all of its source operands are known (i.e., all the source operand fields 426, 428 for a given micro-op have an operand value). It is possible for older micro-ops to be ready before younger micro-ops, and it is possible for younger micro-ops to be ready before older micro-ops. As a result, micro-ops queued in the ALU scheduling queue 402 may be executed out-of-order. In the event that more than one micro-op is ready, the ALU schedulers 406, 408 may age-prioritize the ready micro-ops. In one embodiment, the ALU schedulers 406, 408 may select the oldest-ready micro-op. In another embodiment, the ALU schedulers 406, 408 may select the youngest-ready micro-op. To prevent the ALU schedulers 406, 408 from selecting the same micro-op, the ALU schedulers 406, 408 may also be prioritized. For example, in one embodiment, if only one micro-op is ready and both ALU schedulers, 406, 408 are concurrently searching for a ready micro-op, priority may be given to ALU0 scheduler 406 so that only the ALU0 scheduler 406 selects the ready micro-op. In another embodiment, priority may be given to the ALU1 scheduler 408 so that only the ALU1 scheduler 408 selects the ready micro-op. In another embodiment, if more than one micro-op is ready, priority may be given to ALU0 scheduler 406 so that ALU0 scheduler 406 selects the oldest-ready micro-op, while ALU1 scheduler 408 selects the next oldest-ready op. In another embodiment, priority may be given to the ALU1 scheduler 408 so that the ALU1 scheduler 408 selects the oldest-ready micro-op, while the ALU0 scheduler 406 selects the next oldest-ready op.

Once a micro-op is selected by an ALU scheduler 406, 408, the micro-op and its associated data stored in the various ALU scheduling fields 424, 426, 428 are forwarded to its respective ALU 410, 412, where the micro-op is executed. After an ALU 410, 412 executes the micro-op and a result is produced, the result and its associated result tag may be driven out to the result bus 322. If the result tag driven upon the result bus 322 matches an operand tag stored within the ALU scheduler queue 402 and/or the AGU scheduling queue 404, that particular scheduling queue 402, 404 may replace the operand tag with the corresponding value driven upon the result bus 322. Similarly, if a result tag driven upon the result bus 322 matches a tag stored within the reorder buffer 318, the reorder buffer 318 may replace the tag with the corresponding value driven upon the result bus 322.

Turning now to the AGU scheduling queue 404, micro-ops may be selected for execution by one of the two AGU schedulers (AGU0 scheduler 411, AGU1 scheduler 413). The AGU schedulers 411, 413 may monitor the AGU scheduling queue 404 for ready load or store micro-ops. As previously mentioned, a micro-op may be considered ready if all of its source operands are known (i.e., all the source operand fields 434, 436, 438, for a given micro-op have an operand value). The AGU0 scheduler 411 may be configured to monitor the AGU scheduling queue 404 for ready load micro-ops. For example, the AGU0 scheduler 411 may be configured to select ready micro-ops with a load/store field 442 having a value that indicates that the micro-op is load micro-op. The AGU1 scheduler 413 may be configured to monitor the AGU scheduling queue 404 to select ready store micro-ops. For example, the AGU1 scheduler 404 may search for micro-ops with a load/store field 442 having a value that indicates that the micro-op is a store micro-op. The AGU0 scheduler 411 and the AGU1 scheduler 413 may select a micro-op concurrently. Therefore, it is possible for a load micro-op and a store micro-op to be selected simultaneously. Furthermore, because each AGU scheduler 411, 413 may be coupled to a respective AGU, and each AGU 414, 416 may be coupled to a respective load unit 418 or store unit 420, it is also possible for a load and store micro-op to be executed at the same time.

Much like the micro-ops stored in the ALU scheduling queue 402, it is possible for older micro-ops in the AGU scheduling queue 404 to be ready before younger micro-ops in the AGU scheduling queue 404, and it is possible for younger micro-ops in the AGU scheduling queue 404 to be ready before older micro-ops in the AGU scheduling queue 404. As a result, micro-ops queued in the AGU scheduling queue 404 may be executed out-of-order. In some cases, however, out-of-order execution may not be desired. For example, simultaneously executing a load and store micro-op to the same address may result in loading or storing erroneous data to or from that address. Therefore, load and store micro-ops operating on the same address may be executed in-order.

Accordingly, each of the AGU schedulers 411, 413 may be configured to have an out-of-order execution mode and an in-order execution mode. The execution mode to be used by the AGU schedulers 411, 413 may be based on the value of the mode flag stored in the execution mode field 444. As an illustrative example, if the mode flag is set to 0, the AGU schedulers 411, 413 may use out-of-order execution mode to select a micro-op. On the other hand, if the mode flag is set to 1, the AGU scheduler 411, 413 may use in-order execution mode to select a micro-op. Operations for utilizing the two execution modes are further described with respect to FIG. 6.

Referring still to FIG. 4, load micro-ops selected by the AGU0 Scheduler 411 may be forwarded to the AGU0 414. Data associated with the load micro-op (e.g., the displacement value, the first source operand (i.e., the base address), the second source operand (i.e., the index), and the result tag may also be forwarded to the AGU0 414. The AGU0 414 calculates the load address, and subsequently forwards the load address to the load unit 418. The load unit 418 may read the data from the L1 D-Cache 326 (or the L2 cache 328 or the memory 155 (shown in FIG. 1)) from a location specified by the calculated load address. The data loaded from the L1 D-Cache 325 (or the L2 cache 328 or the memory 155 (shown in FIG. 1)) may be driven out to the result bus 322 along with the result tag. If the result tag driven upon the result bus 322 matches an operand tag stored within the ALU scheduler queue 402 and/or the AGU scheduling queue 404, that particular scheduling queue 402, 404 may replace the operand tag with the corresponding value driven upon the result bus 322. Similarly, if a result tag driven upon the result bus 322 matches a tag stored within the future file 330, the future file 330 may replace the operand tag with the corresponding value driven upon the result bus 322.

Store micro-ops selected by the AGU1 scheduler 413 may be forwarded to the AGU1 416. Data associated with the store micro-op (e.g., the displacement value, the first source operand (i.e., the base address, the second source operand (i.e., the index), and the third source operand (i.e., the data to be written to the store address) may also be forwarded to the AGU1 416. The AGU1 416 may calculate the store address and subsequently forward the store address to the store unit 420. The store unit 420 may then write the data to the L1 D-Cache 326 (or the L2 cache 328 or the memory 155 (illustrated in FIG. 1)) at a location specified by the store address.

Figure 5A:
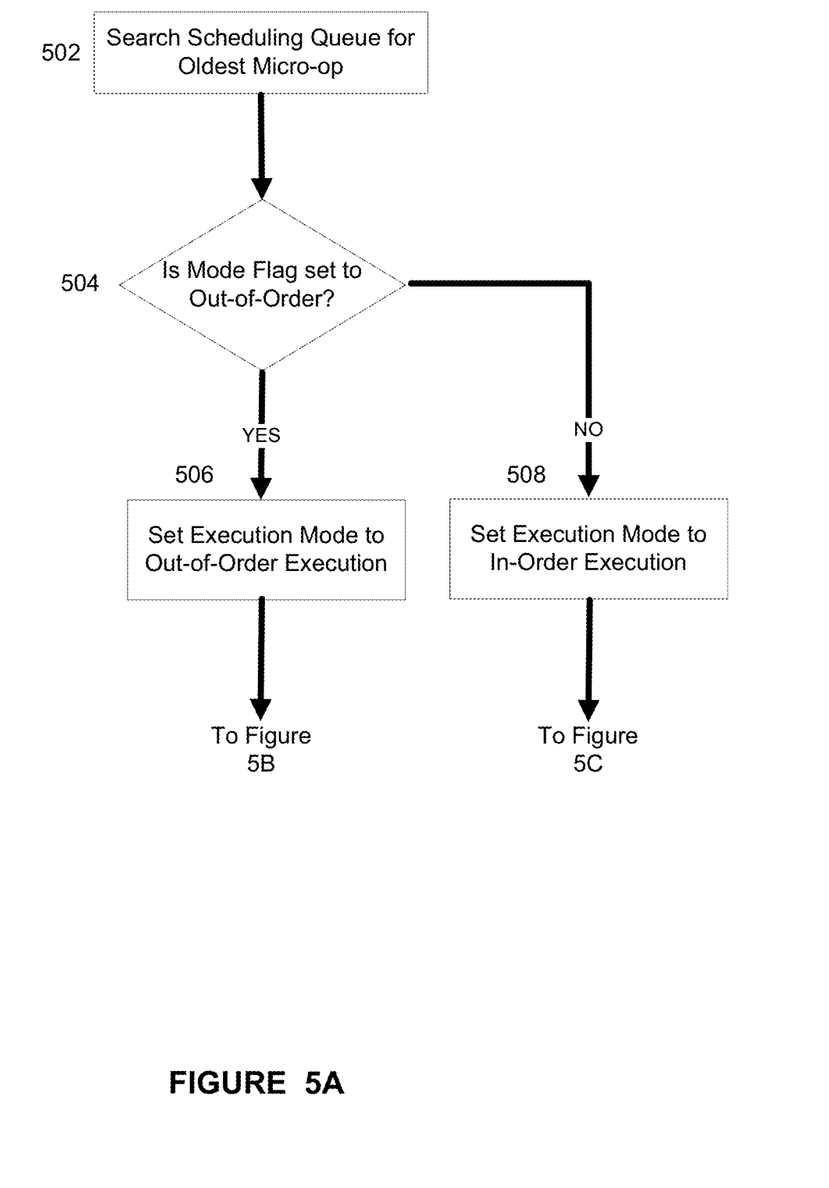
FIG. 5A illustrates a flowchart for selecting an instruction execution mode according to one embodiment of the present invention.
Figure 5B:
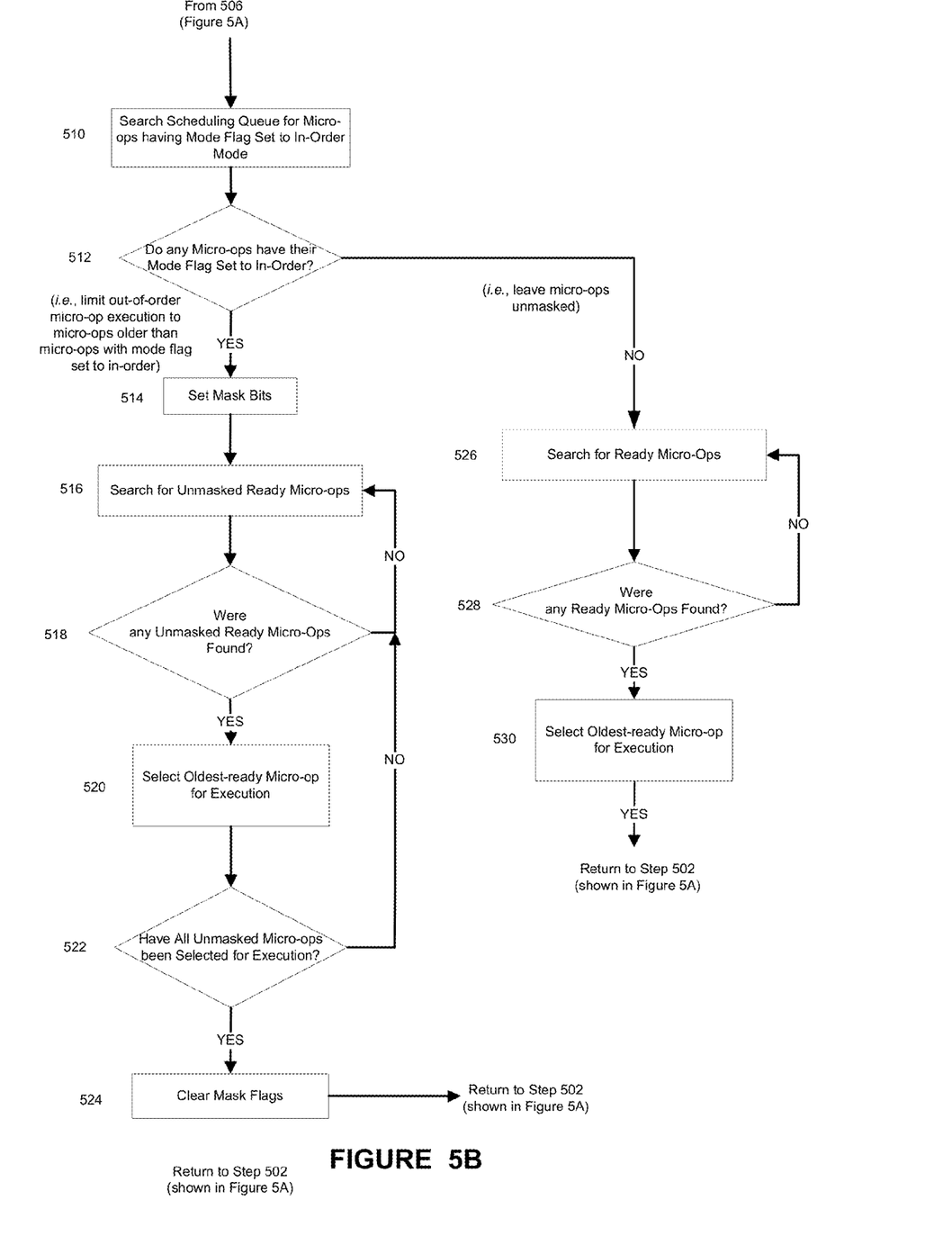
FIG. 5B illustrates a flowchart for out-of-order execution operations according to one embodiment of the present invention.
Figure 5C:
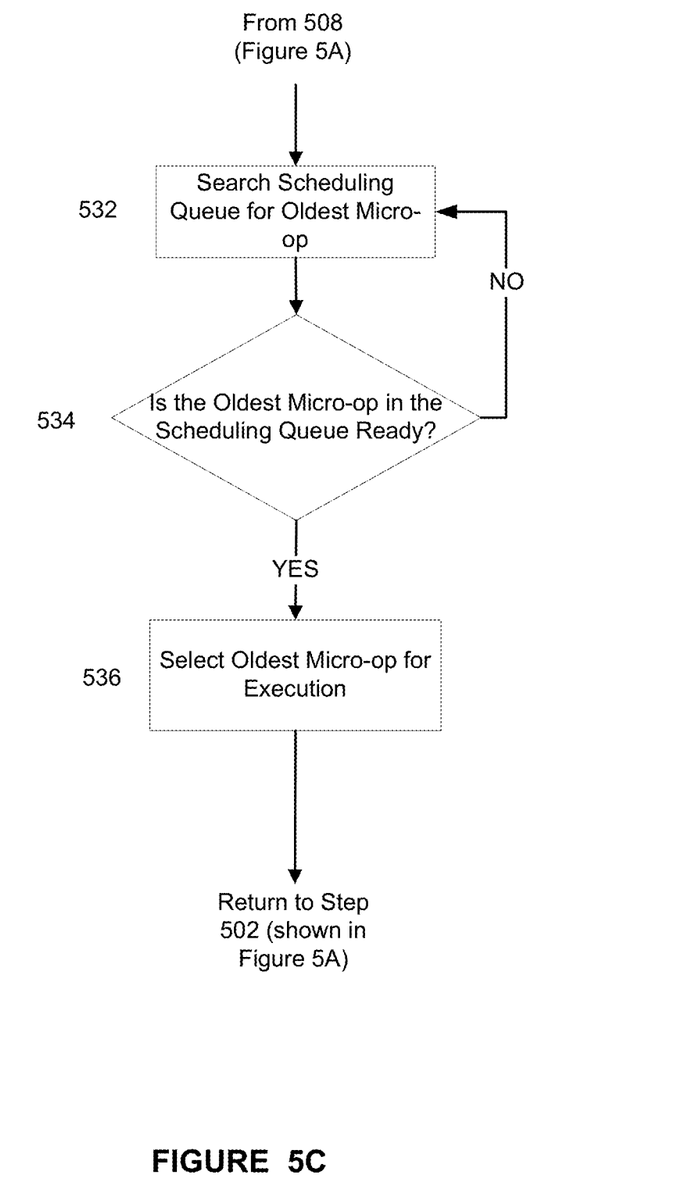
FIG. 5C illustrates a flowchart for in-order execution operations according to one embodiment of the present invention.

Turning now to FIGS. 5A-5C, in accordance with one or more embodiments of the invention, flowcharts for depicting out-of-order and in-order operations performed by the AGU schedulers 411, 413 are shown. FIG. 5A illustrates operations for selecting either the out-of-order execution mode or the in-order execution mode. FIG. 5B illustrates operations performed when the AGU schedulers 411, 413 utilize the out-of-order execution mode. FIG. 5C illustrates operations performed when the AGU schedulers 411, 413 utilizes in-order execution mode. Beginning with FIG. 5A, at step 502, the AGU scheduler 411, 413 searches the AGU scheduling queue 404 for the oldest micro-op. As previously mentioned, the AGU scheduling queue 404 may be implemented in a FIFO configuration. Therefore, the oldest micro-op may be the bottom-most micro-op in the AGU scheduling queue 404. At step 504, it is determined if the mode flag for the micro-op is set to out-of-order execution mode or in-order execution mode. If it is determined that the mode flag is set to out-of-order execution mode, the AGU scheduler 411, 413 is set to out-of-order execution mode at step 506. If it is determined that the mode flag is set to in-order execution mode, the AGU scheduler 411, 413 is set to in-order execution at 508.

Turning now to FIG. 5B, operations performed by the AGU schedulers 411, 413 when in out-of-order execution mode will now be described. At step 510, the AGU scheduler 411, 413 searches the AGU scheduling queue 404 for micro-ops having the mode flag set to in-order execution mode (i.e., in-order micro-ops). At step 512, it is determined if any in-order micro-ops have been found. If it is determined that in-order micro-ops have been found, the mask flags for these micro-ops are set at step 514. The mask flag for other micro-ops that entered the AGU scheduling queue 404 subsequent to the in-order micro-ops (i.e., younger micro-ops) are also set at step 514. The micro-ops that have their mask flags set are no longer available for selection by the AGU schedulers 411, 413, and therefore, are prevented from being selected by the AGU schedulers 411, 413. The micro-ops are prevented from being selected until their mask flags have been cleared. Furthermore, the micro-ops that are to be executed using out-of-order execution are limited to the micro-ops that are older than the micro-ops that have their mode flags set to in-order execution. In doing so, the in-order micro-ops can eventually be selected for execution in program order without having micro-ops younger than the in-order micro-ops interrupt the normal program order. At step 516, the AGU scheduler 411, 413 searches the AGU scheduling queue 404 for unmasked micro-ops that are ready for execution (i.e., unmasked ready micro-ops). As previously mentioned, a micro-op may be ready for execution if all of the source operands for the micro-op have an operand value. Accordingly, the AGU scheduler 411, 413 may search for unmasked micro-ops that have operand values stored in each of their respective source operand fields 434, 436, 438. At step 518, it is determined if any unmasked ready micro-ops have been found in the AGU scheduling queue 404. If it is determined that no unmasked ready micro-ops have been found, the operations return to step 516. If it is determined that unmasked ready micro-ops have been found, the AGU scheduler 411, 413 selects the oldest of the unmasked ready micro-ops and forwards the micro-op to the integer execution unit 312 for execution at step 520.

At step 522, it is determined if all unmasked micro-ops that are older than the masked micro-ops have been executed. If it is determined that other older unmasked micro-ops need to be executed, operation returns to step 516. If it is determined that all the unmasked micro-ops that are older than the masked micro-ops have been executed, the mask flags for the remaining micro-ops in the AGU scheduling queue 404 are cleared at step 524. Thereafter, the operations return to step 502 (illustrated in FIG. 5A), where the AGU scheduler 411, 413 searches for the oldest micro-op in the AGU scheduling queue 404. Now that all the micro-ops older than the in-order micro-ops have been selected from execution, the oldest micro-op in the AGU scheduling queue 404 is now an in-order micro-op. Accordingly, at step 504 the AGU scheduler 411, 413 determines that the oldest micro-op in the AGU scheduling queue 404 has its mode flag set to in-order execution mode and the AGU scheduler 411, 413 is set to in-order execution mode at step 508.

Referring again to step 512, if it is determined that there are no in-order micro-ops in the AGU scheduling queue 404, the mask flags for the micro-ops in the AGU scheduling queue 404 are not set (i.e., the micro-ops are left unmasked). As a result, all the micro-ops currently in the AGU scheduling queue 404 are subject to out-of-order execution. At step 526, the AGU scheduler 411, 413 searches the AGU scheduling queue 404 for any ready micro-ops. At step 528, it is determined if any ready micro-ops were found. If it is determined that ready micro-ops were found, the AGU scheduler 411, 413 selects the oldest-ready micro-op for execution at step 530, and the operations return to step 502 (shown in FIG. 5A). If it is determined that no micro-ops in the AGU scheduling queue 404 are ready, the operations return to step 526, where the AGU scheduler 411, 413 searches the AGU scheduling queue 404 for ready micro-ops.

Turning now to FIG. 5C, operations performed by the AGU scheduler 411, 413 when operating in in-order execution mode will now be described. At step 532, the AGU scheduler 411, 413 searches the AGU scheduling queue 404 for the oldest micro-op and waits for the oldest micro-op to be ready. No other micro-op will be selected for execution because doing so would violate the normal program order. At step 534, it is determined if the oldest micro-op is ready. If it is determined that the oldest micro-op is not ready, the operations returns to step 532, where the AGU scheduler 411, 413 waits for the oldest micro-op to be ready. If it is determined that the oldest micro-op is ready, the AGU scheduler 411, 413 selects the micro-op and forwards the micro-op to the integer execution unit for execution at step 536. After the oldest micro-op is selected for execution, the operations return to step 502 (illustrated in FIG. 5A), where the AGU scheduler 411, 413 searches for the oldest micro-op in the AGU scheduling queue 404. If, at step 502, it is determined that the oldest micro-op has its mode flag set to in-order operation, the AGU scheduler 404 remains in in-order execution mode and continues to select and execute instructions in accordance to the operations shown in FIG. 5C. If the oldest micro-op in the AGU scheduling queue has its mode flag set to out-of-order execution mode (as determined at step 502 (illustrated in FIG. 5A)), the AGU scheduler, 411, 413 may switch to out-of-order execution mode at step 506 (illustrated in FIG. 5A), and continue to select and execute instructions in accordance to the operations shown in FIG. 5B.

It is also contemplated that, in some embodiments, different kinds of hardware descriptive languages (HDL) may be used in the process of designing and manufacturing very large scale integration circuits (VLSI circuits) such as semiconductor products and devices and/or other types semiconductor devices. Some examples of HDL are VHDL and Verilog/Verilog-XL, but other HDL formats not listed may be used. In one embodiment, the HDL code (e.g., register transfer level (RTL) code/data) may be used to generate GDS data, GDSII data and the like. GDSII data, for example, is a descriptive file format and may be used in different embodiments to represent a three-dimensional model of a semiconductor product or device. Such models may be used by semiconductor manufacturing facilities to create semiconductor products and/or devices. The GDSII data may be stored as a database or other program storage structure. This data may also be stored on a computer readable storage medium (e.g., data storage units 160, RAMs 130 & 155, compact discs, DVDs, solid state storage and the like). In one embodiment, the GDSII data (or other similar data) may be adapted to configure a manufacturing facility (e.g., through the use of mask works) to create devices capable of embodying various embodiments of the instant invention. In other words, in various embodiments, this GDSII data (or other similar data) may be programmed into a computer 100, processor 125/140 or controller, which may then control, in whole or part, the operation of a semiconductor manufacturing facility (or fab) to create semiconductor products and devices.

It should also be noted that while various embodiments may be described in terms of memory storage for graphics processing, it is contemplated that the embodiments described herein may have a wide range of applicability, not just for graphics processes, as would be apparent to one of skill in the art having the benefit of this disclosure.

The particular embodiments disclosed above are illustrative only, as the invention may be modified and practiced in different but equivalent manners apparent to those skilled in the art having the benefit of the teachings herein. Furthermore, no limitations are intended to the details of construction or design as shown herein, other than as described in the claims below. It is therefore evident that the particular embodiments disclosed above may be altered or modified and all such variations are considered within the scope and spirit of the claimed invention.

Accordingly, the protection sought herein is as set forth in the claims below.

What is claimed:

1. A method comprising:
   determining whether a first group, comprising at least one or more instructions, is to be selected from a scheduling queue of a processor for execution using either a first execution mode or a second execution mode, wherein said first execution mode is an out-of-order execution mode; and
   responsive to determining that the first group is to be selected for execution using the second execution mode, preventing selection of the first group until a second group, comprising at least one or more instructions, that entered the scheduling queue prior to the first group is selected for execution.

2. The method of claim 1, further comprising:
   selecting the first group for execution using the second execution mode after selecting the second group for execution.

3. The method of claim 1, wherein the second execution mode is an in-order execution mode.

4. The method of claim 1, wherein the first group is a microcoded sequence comprising micro-operations.

5. The method of claim 1, wherein the second group is selected for execution using the first execution mode.

6. The method of claim 1, wherein each instruction stored in the scheduling queue has an associated mode flag that indicates whether the instruction associated with the mode flag is to be selected for execution using either the first execution mode or the second execution mode.

7. The method of claim 6, wherein determining whether the first group is to be selected from the scheduling queue of the processor for execution using either the first execution mode or the second execution mode is determined by reading the mode flag associated with each of the at least one or more instructions of the first group.

8. The method of claim 1, wherein each instruction stored in the scheduling queue has an associated mask flag, which when set, indicates that the instruction associated with the mask flag is unavailable for selection.

9. The method of claim 8, further comprising:
setting the mask flag associated with each of the instructions of the first group after determining that the first group is to be selected and executed using the second execution mode;
setting the mask flag associated with each instruction of a third group of instructions, comprising of at least one or more instructions, that entered the scheduling queue subsequent to the first group after determining that the first group is to be selected and executing using the second execution mode; and
clearing the mask flag associated with each of the at least one or more instructions of the first group and the third group after the second group has been selected and executed.

10. An apparatus, comprising:
a scheduling queue; and
a processor configured to:
determine whether a first group, comprising at least one or more instructions, is to be selected from a scheduling queue of a processor for execution using either a first execution mode or a second execution mode, wherein said first execution mode is an out-of-order execution mode; and
responsive to determining that the first group is to be selected for execution using the second execution mode, prevent selection of the first group until a second group, comprising at least one or more instructions, that entered the scheduling queue prior to the first group is selected for execution.

11. The apparatus of claim 10, wherein the processor is further configured to select the first group for execution using the second execution mode after selecting the second group for execution.

12. The apparatus of claim 10, wherein the second execution mode is an in-order execution mode.

13. The apparatus of claim 10, wherein the first group is a microcoded sequence comprising micro-operations.

14. The apparatus of claim 10, wherein the second group is selected for execution using the first execution mode.

15. The apparatus of claim 10, wherein each instruction stored in the scheduling queue has an associated mode flag that indicates whether the instruction associated with the mode flag is to be selected for execution using either the first execution mode or the second execution mode.

16. The apparatus of claim 15, wherein the processor is configured to determine whether the first group is to be selected from the scheduling queue of the processor for execution using either the first execution mode or the second execution mode by reading the mode flag associated with each of the at least one or more instructions of the first group.

17. The apparatus of claim 10, wherein each instruction stored in the scheduling queue has an associated mask flag, which when set, indicates that the instruction associated with the mask flag is unavailable for selection.

18. The apparatus of claim 17, wherein the processor is further configured to:
set the mask flag associated with each of the instructions of the first group after determining that the first group is to be selected and executed using the second execution mode;
set the mask flag associated with each instruction of a third group of instructions, comprising of at least one or more instructions, that entered the scheduling queue subsequent to the first group after determining that the first group is to be selected and executing using the second execution mode; and
clear the mask flag associated with each of the at least one or more instructions of the first group and the third group after the second group has been selected and executed.

19. A non-transitory computer readable storage medium encoded with data that, when implemented in a manufacturing facility, adapts the manufacturing facility to create an apparatus, comprising:
a scheduling queue; and
a processor configured to:
determine whether a first group, comprising at least one or more instructions, is to be selected from a scheduling queue of a processor for execution using either a first execution mode or a second execution mode, wherein said first execution mode is an out-of-order execution mode; and
responsive to determining that the first group is to be selected for execution using the second execution mode, prevent selection of the first group until a second group, comprising at least one or more instructions, that entered the scheduling queue prior to the first group is selected for execution.

20. The non-transitory computer readable storage medium of claim 19, wherein the processor is further configured to select the first group for execution using the second execution mode after selecting the second group for execution.

21. The non-transitory computer readable storage medium of claim 19, wherein the second execution mode is an in-order execution mode.

22. The non-transitory computer readable storage medium of claim 19, wherein the first group is a microcoded sequence comprising micro-operations.

23. The non-transitory computer readable storage medium of claim 19, wherein the second group is selected for execution using the first execution mode.

24. The non-transitory computer readable storage medium of claim 19, wherein each instruction stored in the scheduling queue has an associated mode flag that indicates whether the instruction associated with the mode flag is to be selected for execution using either the first execution mode or the second execution mode.

25. The non-transitory computer readable storage medium of claim 24, wherein the processor is configured to determine whether the first group is to be selected from the scheduling queue of the processor for execution using either the first execution mode or the second execution mode by reading the mode flag associated with each of the at least one or more instructions of the first group.

26. The non-transitory computer readable storage medium of claim 19, wherein each instruction stored in the scheduling queue has an associated mask flag, which when set, indicates that the instruction associated with the mask flag is unavailable for selection.

27. The non-transitory computer readable storage medium of claim 26, wherein the processor is further configured to:

set the mask flag associated with each of the instructions of the first group after determining that the first group is to be selected and executed using the second execution mode;

set the mask flag associated with each instruction of a third group of instructions, comprising of at least one or more instructions, that entered the scheduling queue subsequent to the first group after determining that the first group is to be selected and executing using the second execution mode; and clear the mask flag associated with each of the at least one or more instructions of the first group and the third group after the second group has been selected and executed.

\* \* \* \* \*